C. BERGER.
SUBMARINE SIGNAL RECEIVING INSTRUMENT.
APPLICATION FILED NOV. 4, 1912.
1,111,351.　　　　　　　　　　Patented Sept. 22, 1914.
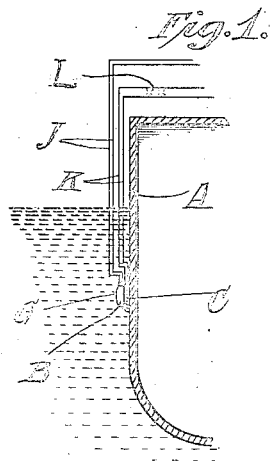
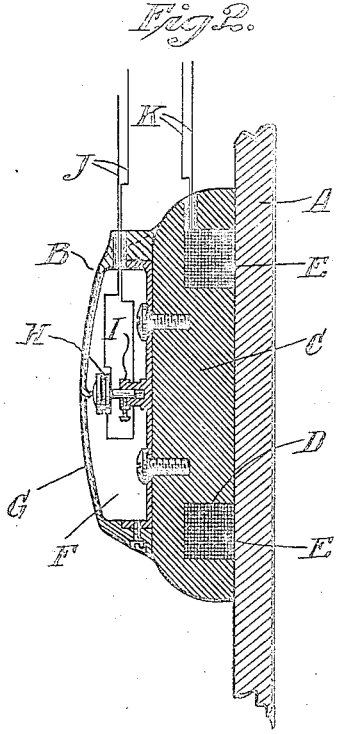

UNITED STATES PATENT OFFICE.

CHRISTIAN BERGER, OF NEW YORK, N. Y., ASSIGNOR TO SUBMARINE WIRELESS COMPANY, A CORPORATION OF NEW YORK.

SUBMARINE SIGNAL-RECEIVING INSTRUMENT.

1,111,351.  Specification of Letters Patent.  Patented Sept. 22, 1914.

Application filed November 4, 1912. Serial No. 729,538.

*To all whom it may concern:*

Be it known that I, CHRISTIAN BERGER, a subject of the King of Hungary, residing at New York, in the county of New York and State of New York, have invented certain new and useful Improvements in Submarine Signal-Receiving Instruments, of which the following is a specification, reference being had therein to the accompanying drawing.

My invention relates to improvements in submarine signal receiving instruments, and more particularly to a receiving instrument adapted to be located at the exterior of a ship or other vessel for receiving sound or light vibrations and permitting the transmission of the same to an observer or appropriate instrument within the ship.

An object of the present invention is to afford an efficient receiving instrument, adapted to be employed in submerged location at the exterior of the ship or other vessel.

A further object is to render such a receiving instrument self-adhering, so that it secures itself, barnacle-like, to the exterior of the ship or vessel without the need of bolts, perforations, or other mechanical attaching means.

A further object is to provide such a device which is applicable to varying positions upon the ship's exterior and easily shifted from one point to another.

Another object is to provide an exterior receiving instrument, wherein the perforation of the ship's shell is obviated for affording communication from the instrument to the interior.

A further object hereof is to provide an apparatus wherein magnetic force is employed to cause adherence to the ship's exterior.

To the attainment of the above and other objects that will hereinafter appear or will be obvious to those skilled in the art, the present invention consists in the novel arrangements, combinations, constructions, and other features hereinafter illustrated and described.

I will first describe an embodiment of the present invention and will thereafter point out the novel features in the claims.

In the accompanying single sheet of drawings forming a part hereof, Figure 1 represents more or less diagrammatically a portion of the hull of a ship or other submerged vessel or body with a submarine signal receiving instrument indicated as applied to the exterior thereof in submerged position. Fig. 2 represents in enlarged central cross-section the preferred details of construction of the receiving instrument shown in Fig. 1.

Similar letters of reference designate the corresponding parts in the two figures.

The exterior or shell A, may be that of a ship or vessel, or other submerged body. To the outside surface of this is applied the exterior receiving instrument B of the present invention, the same, like a barnacle, being adapted to adhere or cling to the ship's exterior. This receiving instrument B combines the following features or portions, namely: a microphone, by which term I include any like device which is sensitive to vibration; and a self-adhering base C, adapted to adhere to the ship's exterior as set forth; said microphone and base joined or united into a single instrument, and there being proper communicating means, whether tubes, or wires, or the like, forming a proper connection from the instrument to the interior of the vessel, or to the observer.

Referring first to the base or body C, I prefer to render this self-adhering through the force of magnetism, whereby not only is the perforation of the ship obviated, but the application of the instrument hereof to any part of the ship is permitted. To this end, the base or body C may be annularly grooved at D, for the reception of a magnet coil E placed therein and adapted to be excited for the purpose of rendering the base C strongly magnetic, so as to cling as before explained to the outside of the iron or steel shell A of the ship or vessel.

Referring next to the vibration-sensitive device, this preferably consists not merely of a microphone, but of an inclosing casing F, within which is a microphone. The casing F is shown secured at the top or outer side of the base C, although obviously the exact relation between the casing F and the base C might be varied. The outer side of the casing F is shown as consisting of a vibratable front wall G, and this wall G serves as a convenient means of communication of signal vibrations in the open water to the microphone H within. The microphone H is shown as so supported (preferably adjustably) within the casing F as to bear operative relation with the vibratable wall or diaphragm G, namely, by means of a support or securing device I.

It will be observed that the instrument above described, not only comprises the self-adhering base and the vibration-sensative device thereon, but comprises the same in such a relation and arrangement and design as to present a generally rounded shape or protuberance, so as to minimize the resistance to moving water, and thereby minimize objectionable vibrations produced by the movement of the water. Obviously, the casing F and base C might be insulated from each other through the use of a dead material such as soft rubber or the like, to exclude from the microphone the action of vibrations from the interior of the ship or vessel.

As a necessary part of the present invention is means of communication from the instrument described to the interior of the ship, or to an observer, that communication herein being shown first, in the form of wires J J, whereby the microphone may be placed in electric circuit with proper instruments inside the ship, and second, wires K K, whereby a powerful electric current may be supplied to the magnetic coils E for energizing the magnetic base C. The wires J J, K K, according hereto, do not need to pass through a perforation in the ship, but may be extended upwardly, as diagramatically indicated in the figures, to the deck, or over the gunwale, or through a port-hole of the ship. In practice, instead of four separate wires as roughly indicated, there would be substituted a single cable containing three or four strands, which on entering the receiving instrument would be properly distributed for the purposes hereof. If desired, an indicating means, such as electric lights L, might be placed as shown, as an indication that current is properly passing through the magnet coils E.

By the above described submarine signal receiving instrument, it will be seen that the objects and advantages hereinbefore referred to are efficiently attained.

It is obvious that many features of arrangement, construction and detail may be modified without departing from the principles hereof, and I therefore do not wish to be restricted to such features, excepting as set forth in the appended claims.

What I desire to secure by Letters Patent is:

1. For submarine signaling a signal receiving instrument adapted to be employed in submerged location at the exterior of a ship or vessel, the same comprising in combination, a microphone, and a self-adhering base bearing the microphone, said base adapted to co-act with a complementary portion of the ship's exterior for mutual adherence therewith, whereby the instrument may be held to the ship in submerged location.

2. For submarine signaling a signal receiving instrument adapted to be employed in submerged location at the exterior of a ship or vessel, the same comprising in combination a microphone, and a self-adhering base bearing the microphone, said base adapted to co-act with any plain-surfaced complementary portion of the ship's exterior for mutual adherence therewith, whereby the instrument may be held to the ship in submerged location.

3. For submarine signaling a signal receiving instrument adapted to be employed in submerged location at the exterior of a ship or vessel, the same comprising in combination, a microphone, and a self-adhering base bearing the microphone, said base adapted to co-act with a complementary portion of the ship's exterior for mutual adherence therewith, whereby the instrument may be held to the ship in submerged location, and exterior conducting means extending from said instrument to above the water line and within the ship for transmitting received signals.

4. For submarine signaling a signal receiving instrument adapted to be employed in submerged location at the exterior of a ship or vessel, the same comprising in combination, a microphone, and a self-adhering base bearing the microphone, said base adapted to co-act with a complementary portion of the ship's exterior for mutual adherence therewith, whereby the instrument may be held to the ship in submerged location, and exterior conducting means extending from said instrument to above the water line and within the ship for transmitting received signals and for maintaining the self-adhering character of the instrument.

5. For submarine signaling a signal receiving instrument adapted to be employed in submerged location at the exterior of a ship or vessel, the same comprising in combination, a microphone, and a self-adhering base bearing the microphone, said base adapted to co-act with a complementary portion of the ship's exterior for mutual adherence therewith, whereby the instrument may be held to the ship in submerged location, and said base and microphone designed, fitted and arranged to present an exterior rounded or non-resisting contour.

6. For submarine signaling a signal receiving instrument adapted to be employed in submerged location at the exterior of a ship or vessel, the same comprising in combination, a microphone, and a magnetizable base bearing the microphone, said base adapted to co-act with a magnetizable portion of the ship's exterior for mutual magnetic adherence therewith, whereby the instrument may be held to the ship in submerged location.

7. For submarine signaling a signal receiving instrument adapted to be employed in submerged location at the exterior of a ship or vessel, the same comprising in combination, a microphone, and a magnetizable base bearing the microphone, said base adapted to co-act with a magnetizable portion of the ship's exterior for mutual magnetic adherence therewith, whereby the instrument may be held to the ship in submerged location at any desired point on the ship without perforation of the latter.

8. For submarine signaling a signal receiving instrument adapted to be employed in submerged location at the exterior of a ship or vessel, the same comprising in combination, a microphone, and a magnetizable base bearing the microphone, said base adapted to co-act with a magnetizable portion of the ship's exterior for mutual magnetic adherence therewith, whereby the instrument may be held to the ship in submerged location at any desired point on the ship without perforation of the latter, and the instrument constructed or incased to have an outwardly rounded contour.

9. For submarine signaling a signal receiving instrument adapted to be employed in submerged location at the exterior of a ship or vessel, the same comprising in combination, a microphone, and a magnetizable base bearing the microphone, said base containing an electro-magnetic coil adapting it to co-act with a magnetizable portion of the ship's exterior for mutual magnetic adherence therewith, whereby the instrument may be held to the ship in submerged location.

10. For submarine signaling a signal receiving instrument adapted to be employed in submerged location at the exterior of a ship or vessel, the same comprising in combination, a microphone, and a magnetizable base bearing the microphone, said base containing an electro-magnetic coil adapting it to co-act with a magnetizable portion of the ship's exterior for mutual magnetic adherence therewith, whereby the instrument may be held to the ship in submerged location, and exterior electrical conductors leading upward from said instrument for conveying signals therefrom and magnetizing current thereto.

In testimony whereof I affix my signature in presence of two witnesses.

CHRISTIAN BERGER.

Witnesses:
JOHN H. DANIELS,
JOHN M. RUSSELL.